G. I. DILL.
BINDER OR HARVESTER CARRYING DEVICE.
APPLICATION FILED AUG. 18, 1915.
1,180,257.
Patented Apr. 18, 1916.
2 SHEETS—SHEET 1.
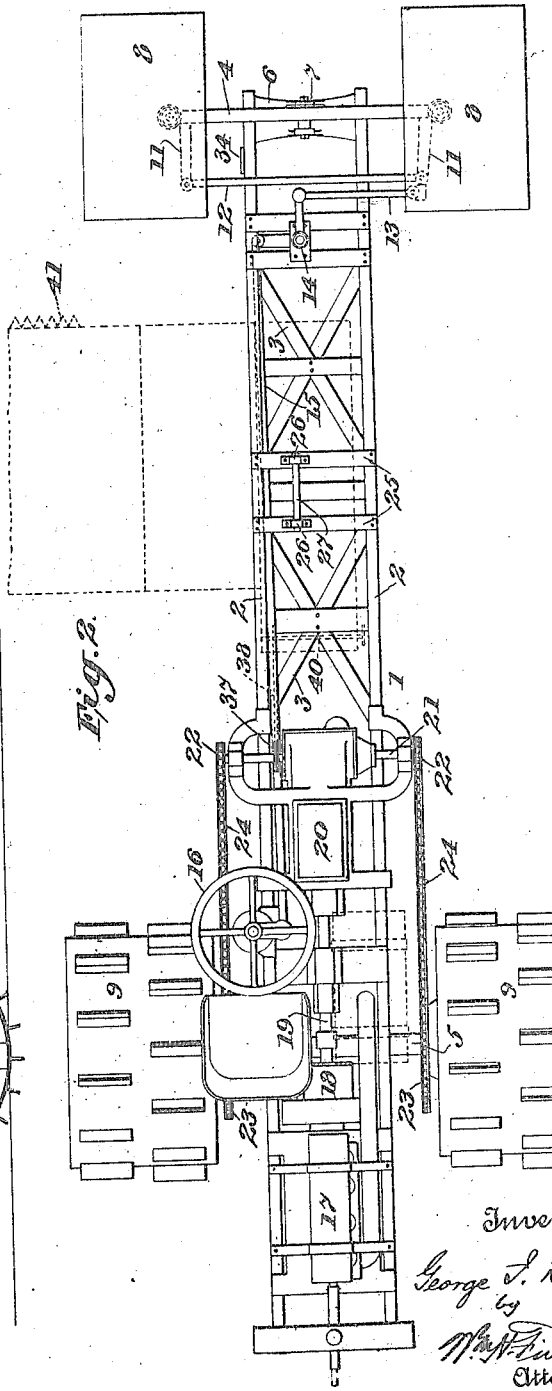
Inventor
George I. Dill

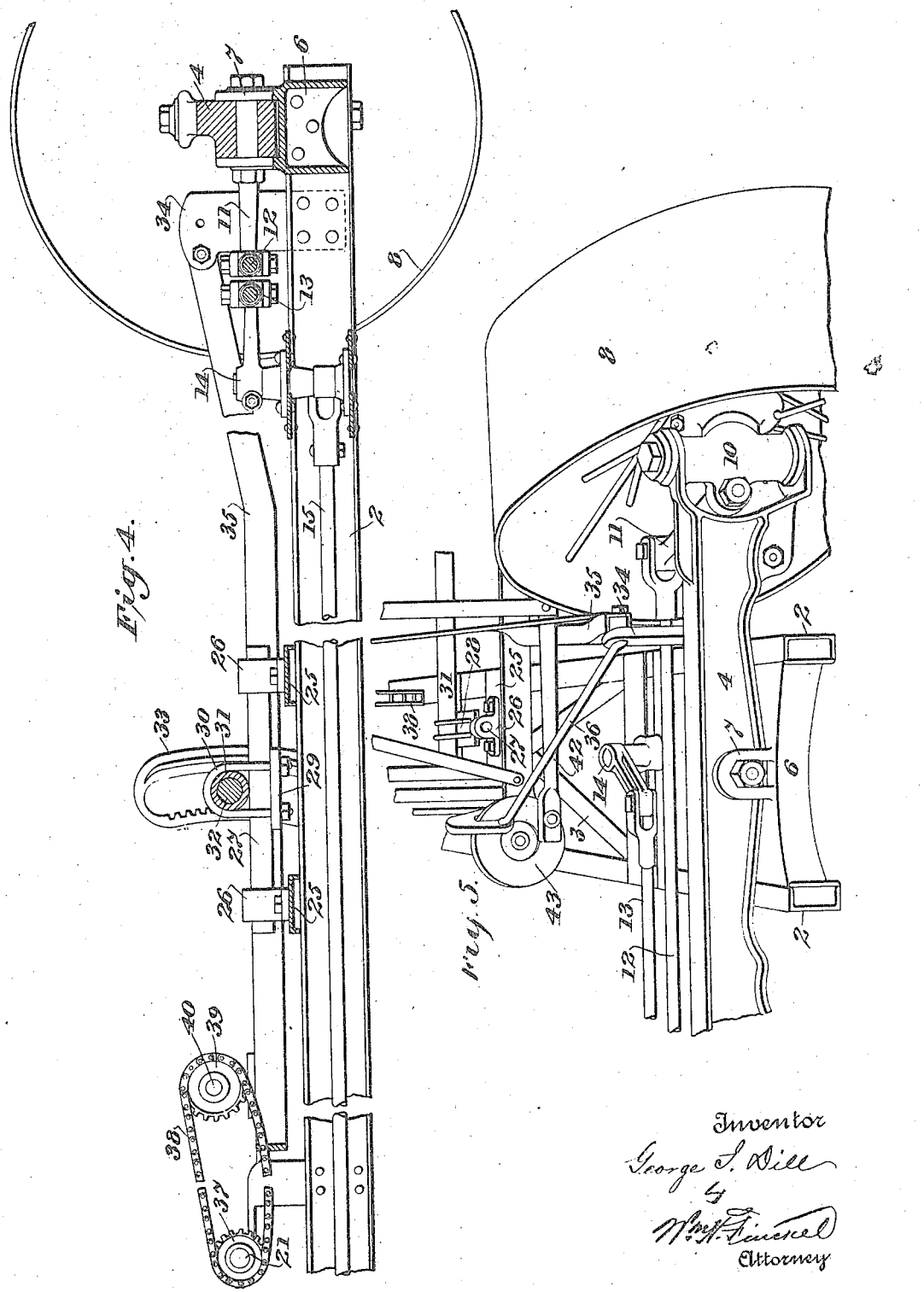

UNITED STATES PATENT OFFICE.

GEORGE I. DILL, OF HARRISBURG, ARKANSAS, ASSIGNOR TO G. I. DILL TRACTOR MANUFACTURING COMPANY, OF HARRISBURG, ARKANSAS, A CORPORATION OF ARKANSAS.

BINDER OR HARVESTER CARRYING DEVICE.

1,180,257.  Specification of Letters Patent.  Patented Apr. 18, 1916.

Application filed August 18, 1915. Serial No. 46,201.

*To all whom it may concern:*

Be it known that I, GEORGE I. DILL, a citizen of the United States, residing at Harrisburg, in the county of Poinsett and State of Arkansas, have invented a certain new and useful Improvement in Binder or Harvester Carrying Devices, of which the following is a full, clear, and exact description.

As is known, rice is cultivated in the United States by planting the seed in land that may be readily overflowed with water during the progress of the growth of the plants, so that the land becomes saturated with water and of a boggy nature. As the crop is maturing, the land is drained, and harvesting begins at once, so that the grain may be obtained before it becomes overripe. Unless the grain is harvested upon maturity, it loses its high grade or quality and diminishes in commercial value. At the time of harvest, however, the land is so soft that draft animals and the wheels of wheeled machinery sink into the soil and increase the difficulty of harvesting, so that it becomes necessary at times to send into the fields men with cradles and other hand harvesting instruments to complete the harvesting.

Ordinary harvesting machines using broad tread bull-wheels as their supports and as means for operating the cutter bars, binders and other accessories, are only partly available for rice harvesting, because even though the bull-wheel should not sink too far into the soft earth, the draft animals are greatly encumbered themselves by sinking into the soft earth.

The invention herein has for its primary object to make available to the rice grower any ordinary harvesting machine; and to this end the invention consists in a power-driven truck having a frame supported on wheels the treads of which are sufficiently broad to minimize, if not prevent, sinking into the soft earth, this frame supporting the motor, preferably an internal combustion engine, or as it is more familiarly called, a gasolene engine, which is used to propel the truck, which last is so constructed, as hereinafter explained, that the bull-wheel of the harvesting machine may be removed and the harvesting machine then mounted upon the truck and its harvesting elements, such as the cutter-bar, binder and the like, connected with the motor and the whole thus used to harvest the grain, as I will proceed now to explain and finally claim.

In the accompanying drawings illustrating the invention, in the several figures of which like parts are similarly designated, Figure 1 is a side elevation of the truck or tractor adapted to receive a binder or other harvesting machine and operate it. Fig. 2 is a top plan view showing in dotted outline in a conventional way a binder mounted thereon. Fig. 3 is a perspective view of the means for securing the binder or other harvesting machine in operative position on the truck or tractor. Fig. 4 is a longitudinal sectional elevation on a larger scale illustrating the front end of the truck or tractor and parts of the binder mounted thereon. Fig. 5 is a perspective view of a portion of the front of the truck or tractor and portions of the binder mounted thereon.

In carrying out my invention a suitable frame or chassis 1 may be provided, of substantially rectangular formation, and including the longitudinal side frame members 2, suitably braced between ends by diagonal members or lattice-work 3. Preferably the frame is dropped between the front axle 4 and the rear axle 5 so as to support the harvesting machine near the ground. As herein shown, the side frame members 2 are connected by a front piece 6 on which rises a bearing 7 in which the front axle 4 is pivoted so as to have an oscillating motion. The rear ends of the side frame members may be connected by a cross-piece similar to the front cross-piece 6, but without bearings. This frame is mounted upon the extremely broad tread front wheels 8 and similar rear traction wheels 9. The front wheels are connected with the front axle 4 by suitable knuckles 10, having arms 11 connected by a rod 12, and one of these arms supplied with a link 13 which is connected with a steering head 14 mounted on the chassis or frame and connected by a rod 15 with a suitable steering gear the steering wheel of which is shown at 16 located near the rear of the chassis. The power mechanism is located at the rear of the chassis, and as here shown, may consist of a suitable internal combustion or gasolene engine 17 and accessories. Power from the engine is transmitted to the rear or traction wheels 9 through clutch 18, drive shaft 19, transmission 20, and jack shaft 21, on which last are mounted the sprockets 22 connected with sprockets 23 on the rear wheels by drive chains 24, although the invention is not limited to these power details.

On the frame are mounted the crosspieces 25, from which rise the bearings 26, and these bearings support a shaft 27, with which is connected the clip 28, by which the axle of the harvesting machine is engaged in such manner that the demounted harvesting machine may be mounted upon and carried and driven by the tractor, so as to be capable of performing all of its functions. As here shown, the clip comprises a plate 29 adapted to fit against the shaft 27, and the U bolts 30. In case of a harvesting machine using a bullwheel as its support and driver, the bullwheel is removed and a sleeve 31 is slipped over its axle 32 in place of the bullwheel and this sleeve is engaged by the clip 28 and thereby rigidly connected with the shaft 27 while at the same time the bullwheel axle 32 is free to rotate therein. The harvesting machine is thus mounted bodily upon the chassis so as to be capable of being tilted and otherwise adjusted as the nature of the ground and the work may require, the shaft 27 being free to turn in its bearings 26. The harvesting machine toothed sector 33 shown in Fig. 4, may be used for adjusting it as usual. The front of the chassis is provided with an upright draft bracket 34, which may be bolted to one of the side frame members 2, and the stubtongue 35 of the harvesting machine is bolted to this bracket so that the draft on the harvesting machine may be natural, that is to say, the same as when the harvesting machine is drawn by horses. The opposite side of the harvesting machine may be connected with this bracket by the brace rod 36.

The harvesting machine may be connected with the power on the tractor in any suitable way, so that its moving parts may be given the motions necessary to perform the functions of the machine. As one simple and convenient means to this end I have shown the jack shaft 21 supplied with a sprocket 37 and connected by a chain 38 with a usual sprocket wheel 39 on the main shaft 40 of the harvesting machine, which imparts motion to all of the moving parts of the harvesting machine. This chain 38 may be the chain that is used to connect the ordinary sprocket of the bull-wheel with the main shaft 40.

As shown in Fig. 2 by dotted lines, a binder should be mounted on the truck or tractor so that its cutter bar 41 will be located at the rear of the front wheel and outside of its path of movement, so that the front wheel is free to travel alongside the grain and permit the cutter bar to cut a full swath. This arrangement also provides for the proper movement of the front wheels for steering purposes. The cutter bar 41 is connected by the rod or pitman 42 with a crank shaft 43, which is driven from the main shaft 40, all as usual.

The bearings 26 are shown located to one side of the longitudinal center of the frame and will be so arranged to receive a left-hand machine. These bearings may be otherwise located to suit the kind of machine to be carried on and operated by the tractor.

The means for tilting the harvesting machine are preferably a constituent part of the machine itself, or such means may be a part of the truck or tractor itself, although the invention is not limited to the use of any particular form or location of tilting mechanism.

The present invention provides a tractor or power-driven truck upon which a demounted harvester or binder or other machine may be secured and moved over a field and its functioning parts operated, and from which the harvester or other foreign machine may be removed and again rendered available for service under other conditions without any alteration whatever excepting the renewal or replacing of its bull-wheel, tractor wheel or driving medium; and the invention is especially valuable in the harvesting of rice, but is equally available for harvesting other crops, especially on wet or soft ground.

The engine or motor, that is to say, the power plant, is located at the rear of the frame and at the rear of the foreign or extraneous machine which is supported on the truck or frame, and in this way strength is imparted to the truck to overcome obstacles; and moreover, the truck is more readily manipulated and especially turned in the field.

The invention is not limited to a four-wheel truck, nor is it limited to use in connection with any special kind of harvester or binder; but it is applicable to any kind of agricultural or other machinery which may be capable of being demounted and carried by the truck or tractor.

The rice harvest comes at or about the beginning of the rainy season of the year in the climate where rice is grown, and after the ground has been flooded in which the rice is grown. Sometimes the rainy season sets in before harvest, and keeps the ground so soft that it is well-nigh impossible to harvest the crop in the usual way. It is under these conditions that the use of my invention is particularly valuable. Of course, the invention is equally useful where wet or soft ground is encountered in the harvesting of other small grains.

What I claim is:—

1. In a self-propelled wheeled truck or tractor, means to receive and support a demounted harvesting machine, and movable means on said truck or tractor to engage the axle of the demounted machine and retain said machine bodily on the truck or tractor.

2. In a self-propelled wheeled truck or tractor, the combination of side frame members, cross-bars thereon, a shaft supported in bearings on said cross-bars and a clip applied to said shaft and adapted to engage with the shaft of a demounted harvesting machine placed upon the truck or tractor.

3. A tractor for demountable harvesting machines, having a chassis, bearings thereon, a shaft turning in such bearings, a sleeve to receive the axle of the harvesting machine, and a clip for rigidly fixing the sleeve to the shaft in the bearings.

4. A tractor for demountable harvesting machines, having a chassis, bearings thereon, a shaft turning in such bearings, a sleeve to receive the axle of the harvesting machine, and a clip for rigidly fixing the sleeve to the shaft in the bearings, said clip comprising a plate fitted to said shaft and U bolts engaging the plate and sleeve.

5. In a self-propelled wheeled truck or tractor, the combination of side frame members, cross-bars thereon, a shaft supported in bearings on said cross-bars, a clip applied to said shaft and adapted to engage with the shaft of a demounted harvesting machine placed upon the truck or tractor, and means for connecting the draft end of the harvesting machine with the fore end of the truck or tractor.

6. In a self-propelled wheeled truck or tractor, the combination of side frame members, cross-bars thereon, a shaft supported in bearings on said cross-bars, a clip applied to said shaft and adapted to engage with the shaft of a demounted harvesting machine placed upon the truck or tractor, and means for connecting the draft end of the harvesting machine with the fore end of the truck or tractor, including a draft bracket fixed to and rising above one of the side frame members.

7. In a self-propelled wheeled truck or tractor, the combination of side frame members, cross-bars thereon, a shaft supported in bearings on said cross-bars, a clip applied to said shaft and adapted to engage with the shaft of a demounted harvesting machine placed upon the truck or tractor, and means for connecting the draft end of the harvesting machine with the fore end of the truck or tractor, including a draft bracket fixed to and rising above one of the side frame members and adapted to engage with the stub-tongue of the harvesting machine.

8. The combination in a wheeled truck or tractor, of a motor for propelling it, side frame members, cross-bars thereon, a shaft supported in bearings on said cross-bars, a clip applied to said shaft and adapted to engage with the shaft of a demounted harvesting machine placed upon the truck or tractor, means for connecting the draft end of the harvesting machine with the fore end of the truck or tractor, and means to connect the motor with the moving parts of the harvesting machine to cause the latter to function.

9. In a wheeled vehicle, the combination of a frame, axles at the front and rear thereof, broad tread wheels on said axles, steering means, a motor for propelling the apparatus, cross-bars mounted on said frame between its front and rear wheels, bearings on said cross-bars, a shaft in said bearings, a sleeve adapted to receive the axle of a demounted machine, a clip for rigidly connecting the shaft and sleeve, and means to connect the operating mechanism of the demounted machine with the motor.

10. In a wheeled vehicle, the combination of a frame, axles at the front and rear thereof, broad tread wheels on said axles, steering means, a motor for propelling the apparatus, cross-bars mounted on said frame between its front and rear wheels, bearings on said cross-bars, a shaft in said bearings, a sleeve adapted to receive the axle of a demounted harvesting machine, a clip for rigidly connecting the shaft and sleeve, a draft bracket mounted at the fore part of the frame, means for connecting it with the draft mechanism of the harvesting machine, and means to connect the functioning mechanism of the harvesting machine with the motor to be operated thereby.

In testimony whereof I have hereunto set my hand this 13th day of August A. D. 1915.

GEORGE I. DILL.

Witnesses:
 THOMAS FLOURNOY,
 LOID DILL.